UNITED STATES PATENT OFFICE.

FRITZ SALOMON, OF ESSEN, GERMANY, ASSIGNOR TO THE FIRM OF FRIED. KRUPP, OF SAME PLACE.

PROCESS OF OBTAINING HYDROGEN AND CARBONIC-ACID GAS.

SPECIFICATION forming part of Letters Patent No. 507,331, dated October 24, 1893.

Application filed June 4, 1892. Serial No. 435,554. (No specimens.)

*To all whom it may concern:*

Be it known that I, FRITZ SALOMON, a subject of the Duke of Brunswick, residing at Essen, in the Kingdom of Prussia, German Empire, have invented new and useful Improvements in Processes of Obtaining Hydrogen Gas and Carbonic-Acid Gas, of which the following is a specification.

My invention has for its object to obtain a water gas substantially free from carbonic oxide and to produce from the same by separation technically pure hydrogen and carbonic acid gas.

When water vapor is passed over incandescent carbonaceous material, gas is obtained composed of a mixture of hydrogen, carbonic oxide and carbonic acid. By operating at a comparatively low temperature less carbonic oxide and more carbonic acid can be obtained, but the maintenance of a low temperature has practical difficulties and less gas is produced. At temperatures at which a plentiful supply of gas is evolved, a considerable quantity of carbonic oxide is always produced in view of the two following reactions occurring simultaneously:

$$C + 2H_2O = CO_2 + H_4$$
$$C + H_2O = CO + H_2.$$

I have found that the reaction of the water vapor takes place more energetically and occurs at low temperatures if the carbonaceous material (coal, coke, peat, &c.) has been previously impregnated with a soluble hydrate or carbonate of the alkalies, or alkaline earths, or with combinations of the alkalies or the alkaline earths which by their decomposition will produce the above mentioned substances.

As suitable for the purposes of my invention may be enumerated the following substances: sodium hydroxide (NAOH); sodium oxide ($Na_2O$); potassium hydroxide (KHO); calcium hydroxide ($CaH_2O_2$); barium hydroxide ($BaH_2O_2$); potassium carbonate ($K_2CO_3$), and sodium carbonate ($Na_2O_3$).

After the carbonaceous material has been impregnated—say with a solution of carbonate of potassium—and dried, the mass is placed into a retort and subjected while at a red heat to ordinary or superheated steam; the production of water gas now takes place at comparatively low temperature and the gas consists almost entirely of carbonic acid and hydrogen. Carbonic acid is present only in minute quantities if the temperature of decomposition is properly restrained. Its quantity is further diminished by the exclusion of atmospheric air, and the use of retorts of clay or other similar refractory material in place of iron; the result being that a gas technically pure from carbonic oxide is obtained.

The gas obtained according to my process may be used for heating purposes—also for illuminating purposes in magnesia lamps—it being adapted especially for these purposes in virtue of the absence of the poisonous monoxide.

To separate the gas into its constituent gases, when the latter are to be used separately, it is passed over lime in the usual apparatus for that purpose, whereby the carbonic acid is absorbed and the hydrogen liberated. The carbonic acid is then regained from the carbonate of lime in any usual manner, as for instance, by the use of one of the stronger acids (sulphuric acid). Of course any other usual process of separation may be followed.

The great tendency of the process to follow the formula $$C + 2H_2O = CO_2 + H_4$$

(carbon and water = carbonic acid + hydrogen)

may be explained by the low temperature of reaction caused by the low heat conductivity of the respective admixtures,—but most probably is caused by an intermediate formation of hydrates of the substances used, whereby the vapor of water is brought into intimate contact with the carbon, so as to cause a reaction according to the above formula. The supposition is that a continuous decomposition and regeneration of hydrate take place, whereby a substantially constant low temperature is maintained. These decompositions and regenerations may be explained by the following formulas:

I. Decomposition of hydrate:

$$K_2CO_3 2H_2O + C = K_2CO_3 + CO_2 + H_4$$

(potassium carbonate with two equivalents of water + carbon = anhydrous potassium carbonate + carbonic acid + hydrogen.)

II. Regeneration of hydrated potassium carbonate:

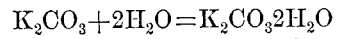
(anhydrous potassium carbonate + water = hydrated potassium carbonate.)

As in the production of alcoholic ethers, under intermediate formation of ether sulphate, a small quantity of sulphuric acid is sufficient to transform a large quantity of alcohol into ether, so in the present case, it may be assumed that a small quantity of the salts mentioned is sufficient to insure the desired course of the process by the intermediate formation of hydrate which effects the necessary condensation of steam upon the carbon.

What I claim as new, and desire to secure by Letters Patent, is—

1. The herein described process for manufacturing a water gas practically free from carbonic oxide, consisting in impregnating the carbonaceous material with an alkaline hydrate, or its equivalent as set forth, then heating the material thus prepared, and passing water vapor into contact with the same.

2. The herein described process for manufacturing hydrogen gas and carbonic acid gas, consisting in impregnating carbonaceous material with an alkaline hydrate, or its equivalent as set forth, then heating the material thus prepared and passing water vapor into contact with the same, and finally separating the gases.

In testimony whereof I have signed my name to this specification in the presence of two subscribing witnesses.

FRITZ SALOMON.

Witnesses:
A. KLINGHAMMER,
CARL FARFOIG.